July 1, 1924.
A. BADOWSKI
1,499,497
PRESSURE GAUGE FOR TIRES
Filed Jan. 22, 1921
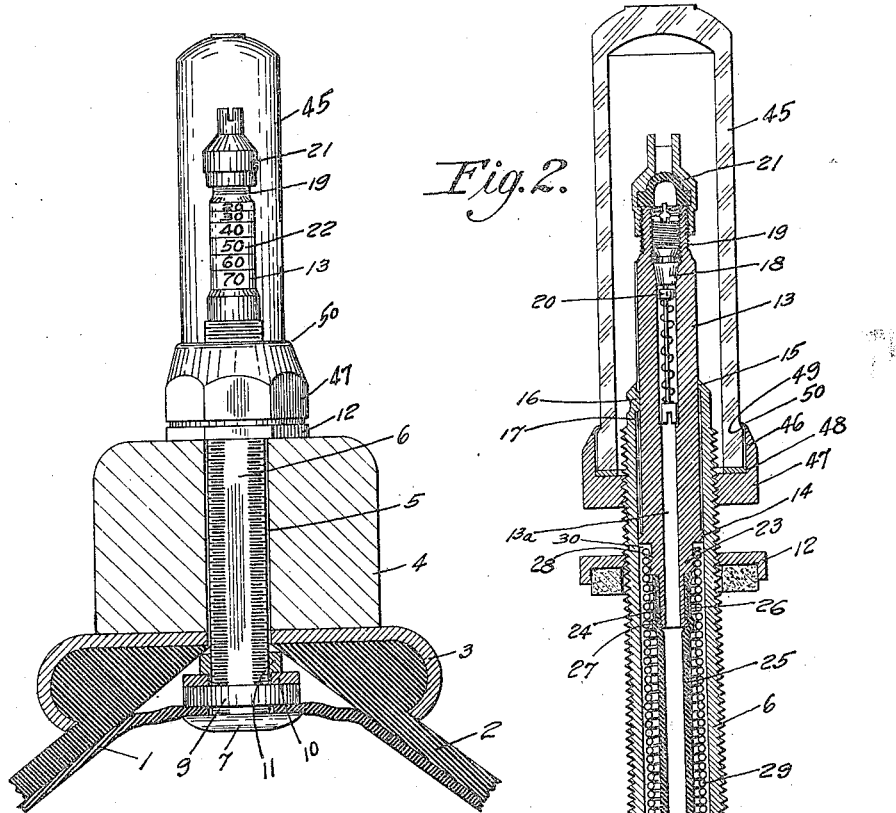
Fig. 1.   Fig. 2.
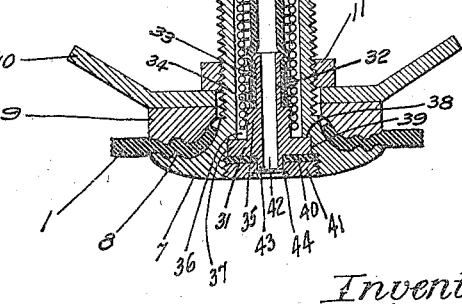
Inventor:
Alfred Badowski,
By
Attorney.

Patented July 1, 1924.

1,499,497

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

PRESSURE GAUGE FOR TIRES.

Application filed January 22, 1921. Serial No. 439,066.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Tires, of which the following is a specification.

This device is designed to register the pressure in receptacles and is particularly adapted for registering the pressure in pneumatic tires. The device is designed to permit its use in inflating the tire so that but one connection to the tire is necessary. Structures of this type have been heretofore made. The present structure is designed to simplify these former constructions. In some of these former devices a rubber tube has been used which formed a part of the connection and permitted a movement of a part indicating the tire pressure. Difficulty has been experienced in so anchoring the ends of this tube as to prevent its breaking at the point of anchoring. One of the purposes of this invention is to avoid this difficulty. These devices also usually involve the use of a spring and the present construction simplifies the anchoring of the spring as well as the rubber tube.

The invention is illustrated in the accompanying drawings as follows:

Fig. 1 shows a section of a wheel rim and portion of a tire with the pressure gauge in place.

Fig. 2 a central section through the pressure gauge.

1 marks the inner tube, 2 the tire, 3 the wheel rim, 4 the wheel felloe, and 5 the valve stem opening through the felloe.

A sleeve 6 extends through the opening 5. It is provided with a head 7 having the corrugations 8 on its upper face. A washer 9 opposes the head 7 having corrugations corresponding to the corrugations 8. The usual spreader plate 10 is arranged above the washer 9 and a clamping nut 11 clamps the tube 1 between the washer 9 and head 8. The usual nut 12 is provided for securing the stem on the felloe. A plunger 13 is slidingly mounted in the sleeve 6. It is provided with a shoulder 14 which engages a shoulder 15 on the sleeve thus preventing the escape of the plunger from the sleeve. The sleeve is provided with a key 16 which extends into the slot 17 in the plunger, thus locking the plunger against turning in the sleeve. A passage $13^a$ extends through the plunger and an inside valve 18 of usual construction is mounted in the screw threaded portion 19 of the passage $13^a$, the movable element of the valve 20 seating in the usual manner to prevent the outward escape of air. The outer end of the plunger is screw threaded to adapt it for connection with the pump and the usual cap 21 is placed on this screw threaded portion. The plunger is provided with a scale 22 which operating in connection with the end of the sleeve readily indicates the pressure to which the plunger is subjected.

The plunger has a stepped extension 23 on its lower end, the smaller portion 24 of this extension receiving the end of a rubber tube 25. The tube is bound on the extension by a twine 26. A shoulder 27 is provided at the extreme lower end of the projection 24 to facilitate the securing of the rubber tube. The larger step of the extension 23 is screw-threaded at 28 and the spring 29 is turned on to this screw thread, thus securing the spring to the plunger. A space 30 is provided between the screw thread and the plunger proper, thus permitting an adjustment of the screw on the plunger so that variations in spring may be compensated for in the assembling of the device.

An anchor piece 31 has a stepped extension thereon, the smaller projection 32 being of a size to receive the rubber tube 25, the rubber tube being bound on this projection by a thread 33 and having a shoulder 34 for better securing the tube. The larger step 35 of the anchor piece is screw-threaded and the spring is screwed on to these threads, thus securing the spring on the anchor piece. A small space 36 is provided back of the threads to permit of the adjustment of the anchor piece relatively to the spring so as to permit of the adjustment of the spring.

The anchor piece has a flange 37 which engages a shoulder 38 at the bottom of the socket 39, this forming a base for the anchor piece. A gasket 40 is arranged over the flange 37 and a lock nut 41 is screwed into the socket 39 against the gasket. The anchor piece has a passage 42 and a small projection 43 which extends through the gasket and into the lock nut. Thus when the gasket is compressed, thus expanding it against the side walls of the socket the projection 43 prevents the gasket closing the opening 42 in the anchor piece. The lock nut 44 has a small slot by means of which it may be screwed into place. By screwing the lock nut directly against the rubber the rubber forms a locking means for preventing the back turning of the lock nut in use. This construction of anchor piece at the inner end of the tube and spring the manner of securing the tube and spring at the plunger end is practically duplicated. As heretofore stated difficulty has been experienced in the breaking of the tubes particularly where the inner ends of the tubes have been provided with flanges as has been the common practice. By this construction both ends of the tube are the same so that an ordinary shape tube may be used and the tube does not have any tendency to break at the point of securing. A cap 45 is preferably provided for the device. It extends into a socket 46 of a base 47. A gasket 48 is arranged in the bottom of the socket. The glass cap is provided with a shoulder 49 and the upper wall of the socket is crimped at 50 over the shoulder, thus securing the glass in place.

It will be noted that the key 16 is formed by indenting the walls of the sleeve 6 forcing a portion of this wall into the key-way. This makes a very simple method of manufacture. With the structure shown it is preferably accomplished prior to the assembling of the parts but with some structures it may be desirable to make this indenture after the parts are assembled, the key-way being adapted to such a mode of manufacture.

What I claim as new is:—

In a pressure gauge for tires the combination with a sleeve having a head at its inner end; an inwardly opening socket in the head; a plunger slidingly mounted in the sleeve; a tube secured to the plunger; an anchor piece inserted into the socket to which the tube is secured; a gasket seating on the anchor piece and engaging the peripheral walls of the socket, of a shoulder on the anchor piece extending into the center of the gasket; and a nut arranged in the socket and operating against the gasket to seal the gasket against the anchor piece and the peripheral walls of the socket.

In testimony whereof I have hereunto set my hand.

ALFRED BADOWSKI.